United States Patent
Do et al.

(10) Patent No.: US 10,941,053 B2
(45) Date of Patent: Mar. 9, 2021

(54) MICROWAVE SUBSTANCE TREATMENT SYSTEMS AND METHODS OF OPERATION

(71) Applicant: NXP USA, Inc., Austin, TX (US)

(72) Inventors: Steven Y. Do, Chandler, AZ (US); Lionel Mongin, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 466 days.

(21) Appl. No.: 15/848,345

(22) Filed: Dec. 20, 2017

(65) Prior Publication Data

US 2019/0185349 A1 Jun. 20, 2019

(51) Int. Cl.

| C02F 1/32 | (2006.01) |
|---|---|
| C02F 1/30 | (2006.01) |
| C02F 1/48 | (2006.01) |
| H05B 6/70 | (2006.01) |
| H05B 6/80 | (2006.01) |

(Continued)

(52) U.S. Cl.
CPC ............. *C02F 1/302* (2013.01); *B01J 19/126* (2013.01); *C02F 1/48* (2013.01); *H05B 6/686* (2013.01); *H05B 6/705* (2013.01); *H05B 6/802* (2013.01); *B01J 2219/0877* (2013.01);
(Continued)

(58) Field of Classification Search
CPC ........ H05B 6/802; H05B 6/686; H05B 6/705; C02F 1/48; C02F 1/302; C02F 2201/002; C02F 2303/04; C02F 1/30; B01J 19/126; B01J 2219/0877; B01J 2219/1227
See application file for complete search history.

(56) References Cited

U.S. PATENT DOCUMENTS

| 5,641,423 A | 6/1997 | Bridges et al. |
| 6,737,809 B2* | 5/2004 | Espiau ................ H01J 7/46 |
| | | 313/634 |

(Continued)

FOREIGN PATENT DOCUMENTS

| CN | 1335043 A | 2/2002 |
| CN | 1146305 C | 4/2004 |

(Continued)

OTHER PUBLICATIONS

U.S. Appl. No. 15/719,482; not yet published; 37 pages (filed Sep. 28, 2017).

*Primary Examiner* — Cameron J Allen
(74) *Attorney, Agent, or Firm* — Sherry W. Schumm (57) ABSTRACT

A substance treatment apparatus includes an RF signal source, power detection circuitry, a controller, and a transmission path between the RF signal source and a first electrode that radiates electromagnetic energy into a chamber. The RF signal source includes a solid-state amplifier that generates an RF signal. The power detection circuitry detects reflected signal power along the transmission path. Based on the reflected signal power, the controller modifies values of variable components within an impedance matching network electrically coupled along the transmission path to adjust a magnitude of the reflected signal power. The impedance matching network may have a double-ended input connected to a balun, and a double-ended output connected to the first electrode and to a second electrode. Alternatively, the impedance matching network may have a single-ended input connected to the RF signal source, and a single-ended output connected to the first electrode. The second electrode may be grounded.

18 Claims, 5 Drawing Sheets

(51) Int. Cl.
*B01J 19/12* (2006.01)
*H05B 6/68* (2006.01)

(52) U.S. Cl.
CPC . *B01J 2219/1227* (2013.01); *C02F 2201/002* (2013.01); *C02F 2303/04* (2013.01)

(56) References Cited

U.S. PATENT DOCUMENTS

| | | | |
|---|---|---|---|
| 8,258,687 B2 * | 9/2012 | Espiau | H01J 65/044 |
| | | | 313/161 |
| 8,344,625 B2 * | 1/2013 | Espiau | H01J 65/044 |
| | | | 315/235 |
| 8,562,793 B2 | 10/2013 | Novak | |
| 9,564,860 B2 | 2/2017 | Cam et al. | |
| 9,809,480 B2 | 11/2017 | Stephenson et al. | |
| 2002/0046474 A1 | 4/2002 | Novak et al. | |
| 2002/0175163 A1 | 11/2002 | Fagrell | |
| 2004/0084380 A1 | 5/2004 | Kicinski | |
| 2004/0173604 A1 | 9/2004 | Fagrell | |
| 2006/0233699 A1 | 10/2006 | Mills | |
| 2008/0264800 A1 | 10/2008 | Schlager et al. | |
| 2010/0247403 A1 | 9/2010 | Hancock | |
| 2017/0096352 A1 | 4/2017 | Hughes et al. | |

FOREIGN PATENT DOCUMENTS

| | | |
|---|---|---|
| CN | 1798697 A | 7/2006 |
| CN | 201914941 U | 8/2011 |
| CN | 102951760 A | 3/2013 |
| CN | 203021337 U | 6/2013 |
| CN | 203247118 U | 10/2013 |
| CN | 104377106 A | 2/2015 |
| CN | 106301236 A | 1/2017 |
| WO | 2007/117754 A2 | 10/2007 |
| WO | WO-2007126899 A2 | 11/2007 |
| WO | 2010/060233 A1 | 6/2010 |
| WO | WO-2017/017407 A1 | 2/2017 |

\* cited by examiner

MICROWAVE SUBSTANCE TREATMENT SYSTEMS AND METHODS OF OPERATION

TECHNICAL FIELD

Embodiments of the subject matter described herein relate generally to substance treatment apparatus (e.g., wastewater or material treatment apparatus), and more particularly to wastewater treatment apparatuses that utilizes microwave energy.

BACKGROUND

Water treatment systems are used in various industrial and municipal settings to kill pathogens and break down solid matter so that water may be recycled and reused. The environmental solution industry is experiencing ever-greater challenges in treating and recycling the increasing quantities of industrial wastewater and sewage that are the byproducts of the modern age.

Some systems utilize microwave energy to process wastewater. In such systems, wastewater (e.g., sewage or other types of wastewater) is passed through a microwave resonant cavity, and microwave energy is directed into the cavity through one or more waveguides. Such systems may be effective in heating the wastewater and/or materials contained within the wastewater to temperatures that are sufficient to expedite the treatment process. However, these systems often lack desirable efficiency and/or effectiveness.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of substance treatment systems and apparatuses described herein are configured to modify a state of a substance passing through a conduit that includes an input port and an output port. The substance treatment apparatus embodiments include a radio frequency (RF) excitation system, one or more electrodes, a controller, and the conduit. The RF excitation system includes an RF signal source with a solid-state amplifier, a transmission path electrically coupled between an output of the RF signal source and at least one of the electrode(s), an impedance matching network electrically coupled along the transmission path, and power detection circuitry disposed along the transmission path.

During operation of the substance treatment apparatus, as the substance passes through the conduit, one or more electrodes receive RF signal(s) through the transmission path from the RF excitation system, and the electrode(s) convert the RF signal(s) into electromagnetic energy that is radiated by the electrode(s) into a chamber along the conduit. The power detection circuitry detects reflected signal power along the transmission path, and also may detect forward signal power. Based at least on the reflected signal power, the controller may modify one or more values of components within the impedance matching network to reduce a ratio of the reflected signal power to the forward signal power (herein "reflected-to-forward signal power ratio"). Said another way, based on feedback indicating the impedance of the substance and the chamber (e.g., where the feedback is in the form of reflected signal power), the controller may alter the configuration of the impedance matching network to better match the RF excitation system to the variable impedance of the chamber and the substance contained therein. This, in turn, may enable the substance to better absorb the RF energy, thus increasing effectiveness of the treatment process.

In some embodiments, the substance treatment apparatus includes only one electrode. For example, in such embodiments, the electrode may be a conductive helix (i.e., a conductor having a helical shape), and the electrode may be wound around the chamber (or the conduit) so that RF energy is inductively coupled into the chamber, during operation. In other embodiments, the substance treatment apparatus includes two electrodes positioned at opposite sides of the chamber. In some further embodiments, the distance between the two electrodes is less than one wavelength of the RF signal that is provided by the RF excitation system. Accordingly, the chamber is quasi-resonant (or sub-resonant) at the operational RF frequency or within the operational frequency range, and the RF energy is capacitively coupled into the substance within the chamber.

The various embodiments may be incorporated into a variety of different types of systems to achieve different results. For example, embodiments of substance treatment systems and apparatuses discussed herein may be incorporated into water treatment systems, such as stand-alone water treatment units, wastewater treatment systems, and appliances that dispense or utilize water (e.g., refrigerator units, and so on). Alternatively, embodiments of substance treatment systems and apparatuses may be incorporated into systems that are configured to treat non-liquid materials, such as systems configured to treat solid or gaseous materials. In an embodiment of a system configured to treat solid materials, the system may include a conveyor that carries the solid materials through the chamber. Although such embodiments are not discussed in detail herein, the scope of the inventive subject matter is intended to cover such embodiments.

Figure 1:
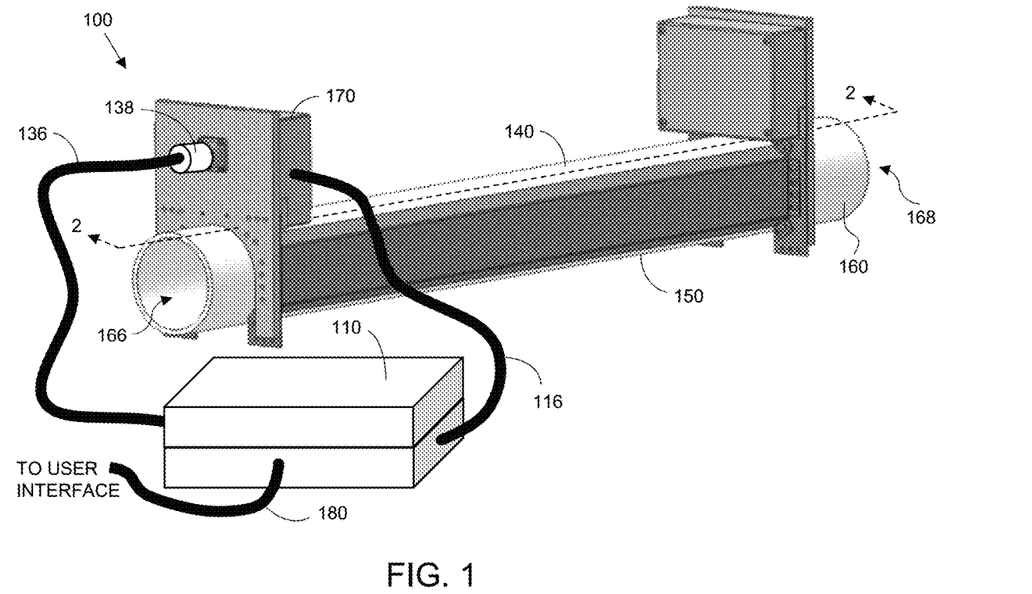
FIG. 1 is a perspective view of a substance treatment system, in accordance with an example embodiment.

FIG. 1 is a perspective view of a substance treatment system 100, in accordance with an example embodiment. FIG. 1 should be viewed in conjunction with FIG. 2, which includes a cross-sectional view of the substance treatment system 100 along line 2-2 of FIG. 1. Substance treatment system 100 may form a portion of a larger system that includes various upstream and downstream subsystems. Although not discussed in detail herein, the upstream and downstream subsystems may include pumping systems, effluent characteristic sensing subsystems (e.g., water or air quality sensors, temperature sensors, pathogen sensors, chemical sensors, and so on), subsystems configured to add chemicals (e.g., catalysts, oxidants, etc.) into the substance undergoing treatment, subsystems configured to filter or otherwise extract solids from the substance undergoing treatment, and/or other types of subsystems that are pertinent to the particular type of substance treatment operation. For the purposes of describing the various embodiments, the below description may refer to the substance as being in a liquid form (e.g., wastewater), however, the systems and apparatuses discussed herein are not limited to systems configured to treat liquid substances. Those of skill in the art would understand, based on the description herein, that the systems described herein may be modified to treat gaseous and solid substances, as well.

Substance treatment system 100 includes an RF signal source and controller subsystem 110 (herein "RF subsystem"), a user interface (e.g., user interface 480, FIG. 4), two electrodes 140, 150, a conduit 160, and a variable impedance matching subsystem 170 (herein "variable matching subsystem"). The RF subsystem 110 is electrically connected (e.g., through coaxial cable 136 and connector 138) to the variable matching subsystem 170, which in turn is electrically connected to the first and/or second electrodes 140, 150. The user interface (not shown in FIG. 1), which may be electrically coupled to the RF subsystem 110 through hardwired connection 180, may include a computer terminal or console with various components (e.g., graphical user interfaces, buttons, dials, keys, displays, and/or other features). The user interface components enable a user to input information into the system regarding system operational parameters, and provide user-perceptible information that enables the user to monitor system operation. In other embodiments, the user interface may be communicatively coupled to the RF subsystem 110 through a wireless connection, in which case the RF subsystem 110 would include a wireless transceiver configured to communicate with a compatible wireless transceiver of the user interface.

Figure 2:
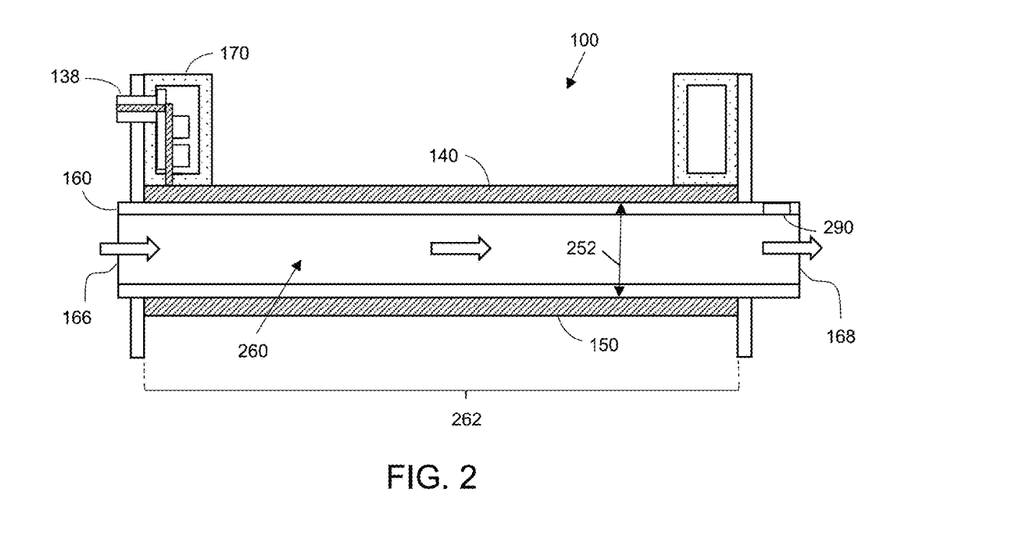
FIG. 2 is a cross-sectional side view of a portion of a substance treatment system along line 2-2 of FIG. 1, in accordance with an example embodiment.

The conduit 160 includes an input port 166, an output port 168, and an interior chamber 260 located between the input and output ports 166, 168. In various embodiments, the conduit 160 may be formed from a non-conductive and/or non-metallic material that is suitable to convey the substance to be treated without undue deterioration of the conduit material. For example, the conduit 160 may be formed from PVC (polyvinyl chloride), other suitable plastics, or other non-conductive and/or non-metallic materials.

During operation of the system 100, a substance or effluent to be treated (e.g., wastewater, other liquids, gasses, and/or solid materials) passes into the input port 166, through the interior chamber 260, and out of the output port 168. The first and second electrodes 140, 150 are positioned in fixed physical locations with respect to each other and the conduit 160. More specifically, the electrodes 140, 150 are positioned on opposite sides of the interior chamber 260. As will be described below, microwave energy radiated into the interior chamber 260 by electrodes 140, 150 may warm the substance (e.g., water, organic matter within the substance, or chemicals within the substance) while the substance is traveling through the conduit 160. This energy may, for example, act as a catalyst to accelerate chemical reactions associated with the substance treatment process. In addition or alternatively, when the energy level is sufficient, the energy may kill pathogens (e.g., bacterium, viruses, fungi, and other microorganisms) in the substance, accelerate the process of breaking down solid matter within the substance, or otherwise alter the state of the substance as it passes through the chamber 260.

According to an embodiment, each of the first and second electrodes 140, 150 is formed from an elongated, substantially-planar, conductive component, which extends between the input and output ports 166, 168 of the conduit 160 along a length 262 of the interior chamber 260. In various embodiments, the lengths 262 of the chamber 260 and electrodes 140, 150 may be in a range of about 5 centimeters (cm) to about 2.0 meters (e.g., about 0.5 meters to about 1.0 meters), although the lengths may be smaller or larger, as well. The widths of the electrodes 140, 150 (i.e., the dimension into the page in FIG. 2) may be in a range of about 2 cm to about 1.0 meter, although the widths may be smaller or larger, as well. For example, each electrode 140, 150 may be formed from a homogenous conductive material (e.g., copper or another conductive material). In other embodiments, each electrode 140, 150 may be a composite structure with a conductive outer surface.

The RF subsystem 110 includes a system controller (e.g., system controller 412, FIG. 4), an RF signal source (e.g., RF signal source 420, 420', FIG. 4), and a power detection circuit (e.g., power detection circuit 430, 430', 430", FIG. 4), in an embodiment. Basic operation involves the RF signal source of the RF subsystem 110 producing an RF signal, which is conveyed through the coaxial cable 136 and connector 138 to the variable matching subsystem 170. The variable matching subsystem 170 performs an impedance transformation, and provides the RF signal to the electrodes 140, 150. The electrodes 140, 150 responsively radiate RF energy into the chamber 260, and thus into any substance passing through the chamber. As will be described in more detail in conjunction with FIG. 4, the electrodes 140, 150 are part of a balanced portion of the system 100, in an embodiment, and thus the electrodes 140, 150 may be provided with RF signals that are about 180 degrees out of phase with each other (e.g., between 120 degrees and 240 degrees out of phase). In such an embodiment, a balun (e.g., balun 474, FIG. 4) may be housed with the variable matching subsystem 170 to convert a single unbalanced RF signal conveyed through the coaxial cable 136 into two balanced RF signals for provision to the electrodes 140, 150. In an alternate embodiment, the RF signal source of the RF subsystem 110 may include a differential amplifier (e.g., amplifier 424', FIG. 4) configured to produce a balanced signal, in which case the balun is unnecessary, and two conductors are used to convey the RF signals to the variable matching subsystem 170 (rather than the single coaxial cable 136). In another alternate embodiment, an RF signal may be provided only to one of the electrodes (e.g., electrode 140), and the other electrode (e.g., electrode 150) may be grounded.

In various embodiments, the RF subsystem 110 is configured to produce the RF signal at an operational frequency in a range of about 10 MHz to about 100 MHz, or a range of about 100 MHz to about 3.0 gigahertz (GHz), although the range of operational frequencies may be different, in other embodiments. The first and second electrodes 140, 150 are separated across the interior chamber 260 by a distance 252. In various embodiments, the distance 252 is in a range of about 0.10 meters to about 1.0 meter, although the distance may be smaller or larger, as well. According to an embodiment, distance 252 is less than one wavelength of the RF signal produced by the RF subsystem 110. In other words, the interior chamber 260 is a sub-resonant chamber. In some embodiments, the distance 252 is less than about half of one wavelength of the RF signal. In other embodiments, the distance 252 is less than about one quarter of one wavelength of the RF signal. In still other embodiments, the distance 252 is less than about one eighth of one wavelength of the RF signal. In still other embodiments, the distance 252 is less than about one 50th of one wavelength of the RF signal. In still other embodiments, the distance 252 is less than about one 100th of one wavelength of the RF signal.

In general, a system 100 designed for lower operational frequencies (e.g., frequencies between 10 MHz and 100 MHz) may be designed to have a distance 252 that is a smaller fraction of one wavelength. For example, when system 100 is designed to produce an RF signal with an operational frequency of about 10 MHz (corresponding to a wavelength of about 30 meters), and distance 252 is selected to be about 0.5 meters, the distance 252 is about one 60th of one wavelength of the RF signal. Conversely, when system 100 is designed for an operational frequency of about 300 MHz (corresponding to a wavelength of about 1 meter), and distance 252 is selected to be about 0.5 meters, the distance 252 is about one half of one wavelength of the RF signal.

With the operational frequency and the distance 252 between electrodes 140, 150 being selected to define a sub-resonant interior chamber 260, the first and second electrodes 140, 150 are capacitively coupled. More specifically, the first electrode 140 may be analogized to a first plate of a capacitor, the second electrode 150 may be analogized to a second plate of a capacitor, and the material within the interior chamber 260 plus the walls of the conduit 160 between the electrodes 140, 150 may be analogized to a capacitor dielectric. Accordingly, the first electrode 140 alternatively may be referred to herein as an "anode," and the second electrode 250 may alternatively be referred to herein as a "cathode."

Essentially, the voltage across the first and second electrodes 140, 150 heats the substance passing through the chamber 260 (e.g., heats organic content or other materials within wastewater), and/or activates chemical reactions within the substance passing through the chamber 260 that result in an acceleration of the treatment process. According to various embodiments, the RF subsystem 110 is configured to generate the RF signal to produce voltages across the electrodes 140, 150 in a range of about 90 volts to about 3000 volts, in one embodiment, or in a range of about 3000 volts to about 10,000 volts, in another embodiment, although the system may be configured to produce lower or higher voltages across electrodes 140, 150, as well.

According to an embodiment, the system 100 also includes power detection circuitry (e.g., power detection circuitry 430, 430', 430", FIG. 4) coupled along the transmission path between the output of the RF signal source (e.g., RF signal source 420, FIG. 4) and the electrodes 140, 150. As will be explained in more detail in conjunction with FIG. 4, the power detection circuitry is configured to detect a magnitude of the reflected signal power, and to convey the detected reflected signal power magnitude to the system controller. In some embodiments, the power detection circuitry also is configured to detect a magnitude of the forward signal power, and to convey the detected forward signal power magnitude to the system controller. The system controller evaluates the signal power magnitude information, and when the magnitude of the reflected signal power exceeds a threshold (and/or a reflected-to-forward signal power ratio exceeds a threshold), the system controller sends control signals to the variable matching subsystem 170 that causes the subsystem 170 to alter its impedance transformation in a manner that reduces the reflected signal power (and/or the reflected-to-forward signal power ratio).

In further embodiments, the system 100 may include additional sensors 290, only one of which is indicated in FIG. 2, which are configured to sense characteristics of the substance traveling through the conduit 160. For example, the additional sensors 290 may sense the temperature of the substance being treated, the flow rate, the electric field intensity within the chamber 260, the presence or quantity of various chemicals, pathogens, or contaminants of the substance, the particulate density within the substance, the clarity of the substance, and/or other characteristics of the substance being treated. The additional sensor(s) 290 may convey the sensed information to the system controller within the RF subsystem 110 and/or to another controller that is responsible for controlling operations of the overall system (including upstream and downstream processes). Based on the sensed information, the controller(s) may alter the flow rate of the substance through the conduit 160, increase or decrease quantities of chemicals added to the substance, increase or decrease the power level of the RF signal produced by the RF subsystem 110, alter the frequency and/or phasing of the balanced signals provided to the electrodes 140, 150, or make other adjustments to system operation.

Figure 3:
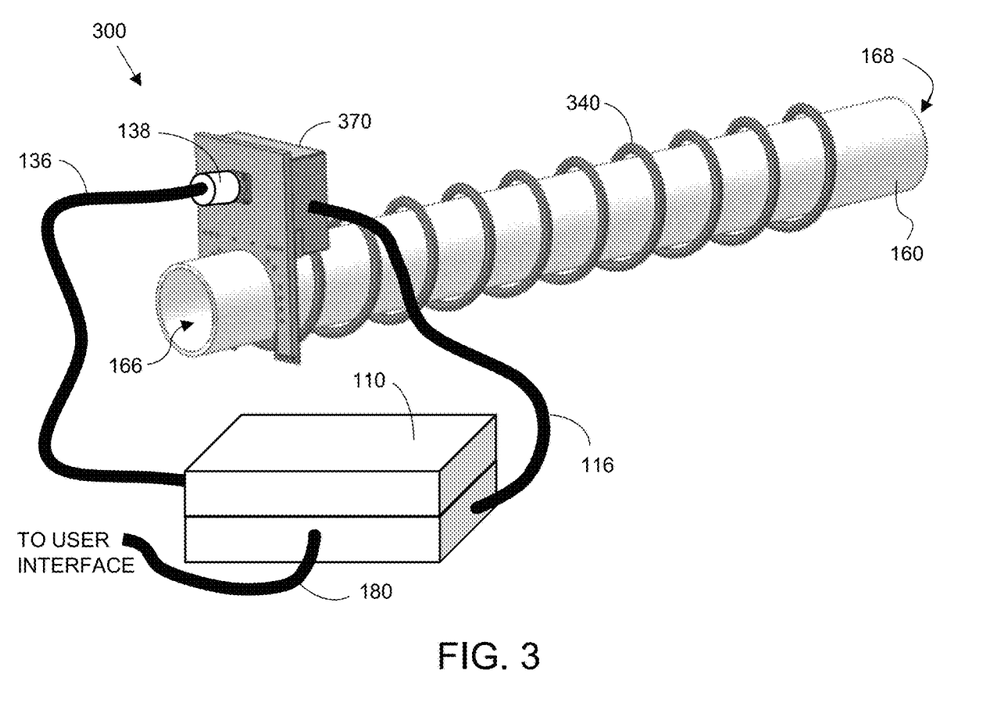
FIG. 3 is a perspective view of a substance treatment system, in accordance with another example embodiment.

As discussed in detail above, the system of FIGS. 1 and 2 includes two electrodes 140, 150, which are capacitively coupled across the chamber 260. In an alternate embodiment, the RF energy may be inductively coupled into the chamber. For example, FIG. 3 is a perspective view of a substance treatment system 300, in accordance with another example embodiment. Substance treatment system 300 is similar to system 100 in many respects, and like reference numbers are used for similar or identical components. The various details and embodiments discussed above with respect to the identically numbered components applies equally to the system 300 of FIG. 3.

As with system 100, substance treatment system 300 includes an RF subsystem 110, a user interface (e.g., user interface 480, FIG. 4), a conduit 160, and a variable matching subsystem 370. In contrast with system 100, system 300 includes only one "electrode" in the form of a conductive coil 340 that is wrapped around the interior chamber (e.g., chamber 260) of the conduit 160. The RF subsystem 110 is electrically connected (e.g., through coaxial cable 136 and connector 138) to the variable matching subsystem 370, which in turn is electrically connected to the coil 340.

During operation of system 300, the RF signal source of the RF subsystem 110 produces an RF signal, which is conveyed through the coaxial cable 136 and connector 138 to the variable matching subsystem 370. The variable matching subsystem 370 performs an impedance transformation, and provides the RF signal to the coil 340. In contrast with the variable matching subsystem 170 of system 100, the variable matching subsystem 370 of system 300 provides a single RF signal to the coil 340. Accordingly, the variable matching subsystem 370 may exclude a balun. In response to receiving the RF signal, the coil 340 responsively generates an electromagnetic field within the chamber, and thus within any substance passing through the chamber. The electromagnetic field produced within the chamber heats the substance passing through the chamber (e.g., heats organic content or other materials within wastewater), and/or activates chemical reactions within the substance passing through the chamber that result in an acceleration of the treatment process.

Also similar to system 100, system 300 includes power detection circuitry (e.g., power detection circuitry 430, FIG. 4) coupled along the transmission path between the output of the RF signal source (e.g., RF signal source 420, FIG. 4) and the coil 340. Again, the power detection circuitry is configured to detect a magnitude of the reflected signal power, and to convey the detected reflected signal power magnitude to the system controller. In some embodiments, the power detection circuitry also is configured to detect a magnitude of the forward signal power, and to convey the detected forward signal power magnitude to the system controller. The system controller evaluates the signal power magnitude information, and when the magnitude of the reflected signal power exceeds a threshold (and/or a reflected-to-forward signal power ratio exceeds a threshold), the system controller sends control signals to the variable matching subsystem 370 that causes the subsystem 370 to alter its impedance transformation in a manner that reduces the reflected signal power (and/or the reflected-to-forward signal power ratio).

In the embodiments of FIGS. 1-3, the RF subsystem 110 and a variable matching subsystem 170, 370 are separately housed, and are electrically connected through coaxial cable 136. In an alternate embodiment, the RF subsystem 110 and the variable matching subsystem 170, 370 may be housed together and directly electrically connected, rather than being electrically connected through a coaxial connection. In such embodiments, the user interface (e.g., user interface 480, FIG. 4) also may be housed with the RF subsystem 110 and the variable matching subsystem 170, 370, or the user interface may be connected through a hardwired connection (e.g., connection 180) or a wireless connection to the RF subsystem 110.

Figure 4:
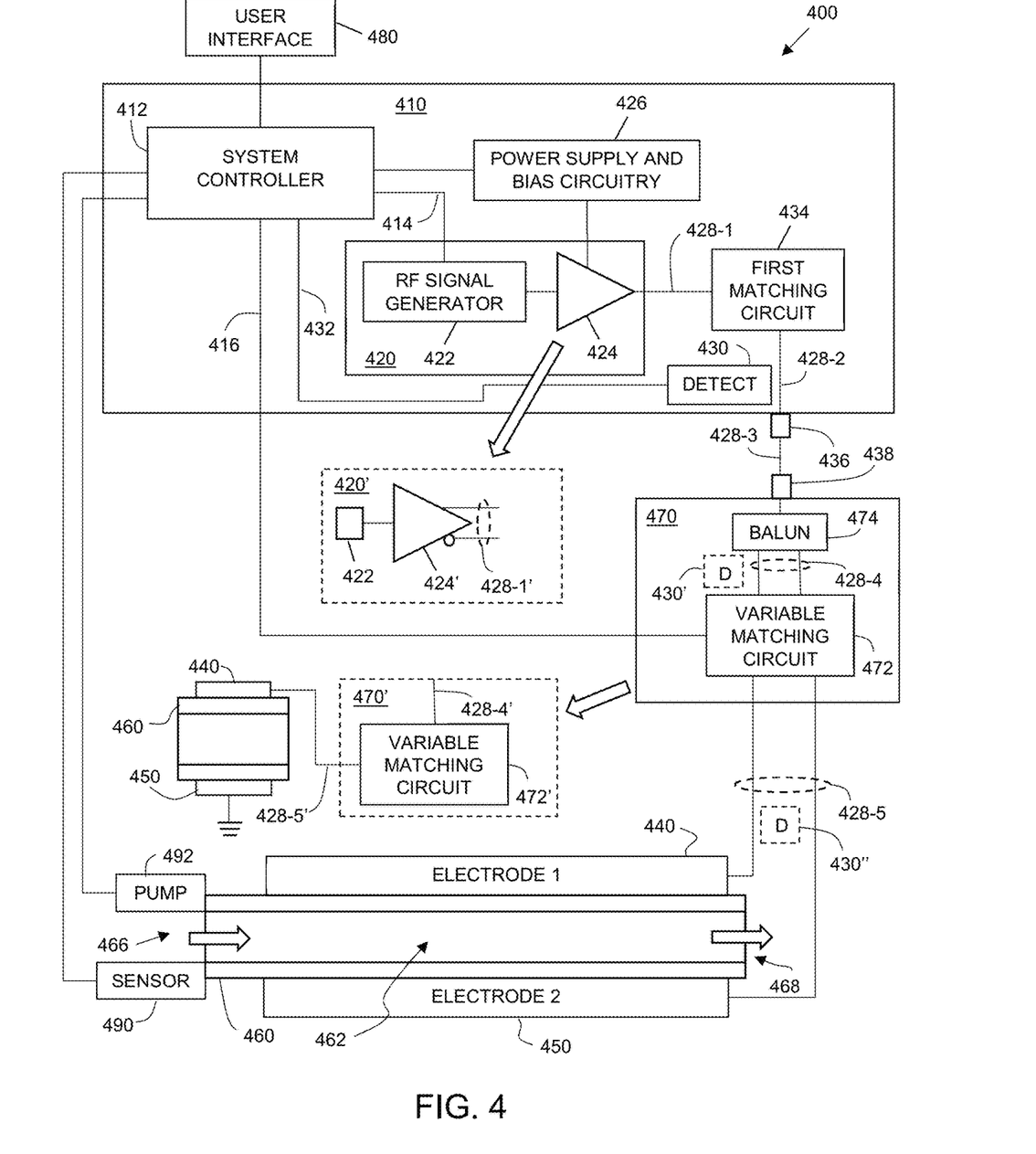
FIG. 4 is a simplified block diagram of a substance treatment system, in accordance with an example embodiment.

FIG. 4 is a simplified block diagram of a substance treatment system 400 (e.g., system 100, FIG. 1), in accordance with an example embodiment. It should be understood that FIG. 4 is a simplified representation of a substance treatment system 400 for purposes of explanation and ease of description, and that practical embodiments may include other devices and components to provide additional functions and features, and/or the substance treatment system 400 may be part of a larger electrical system.

Substance treatment system 400 includes an RF subsystem 410 (e.g., RF subsystem 110, FIG. 1), a user interface 480, two electrodes 440, 450 (e.g., electrodes 140, 150, FIG. 1), a conduit 460 (e.g., conduit 160, FIG. 1), and a variable matching subsystem 470 (e.g., subsystem 170, FIG. 1). Further, system 400 may include one or more sensors 490, which are configured to provide sensor signals that may be used by the RF subsystem 410 to alter operations of the RF subsystem 410. Further still, the system 400 may include a pump 492, which is configured to facilitate the flow of a substance being treated (e.g., wastewater or other liquids) through the conduit 460. In an alternate embodiment in which the system 400 is used to treat gaseous substances, the pump 492 may be replaced with a fan or valve, which is configured to move the gaseous substance through the conduit 460. In another alternate embodiment in which the system 400 is used to treat solid matter, the pump 492 may be replaced with a conveyor system, which is configured to move the solid matter through the conduit 460.

User interface 480 may correspond to a control panel, for example, which enables a user to activate the system 400, and to provide inputs regarding operational parameters (e.g., the duration of system activation, the flow rate of material through the conduit 460, RF signal frequencies and power levels (e.g., for the RF signal produced by RF subsystem 410), thresholds (e.g., reflected power threshold and/or reflected-to-forward signal power ratio threshold), and so on). In addition, the user interface may be configured to provide user-perceptible outputs indicating the operational status of the system and other information (e.g., information based on signals from sensors 490).

The RF subsystem 410 includes a system controller 412, an RF signal source 420, a first impedance matching circuit 434 (herein "first matching circuit"), power supply and bias circuitry 426, and power detection circuitry 430, in an embodiment. System controller 412 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, system controller 412 is operatively and communicatively coupled to user interface 480, RF signal source 420, power supply and bias circuitry 426, power detection circuitry 430 (or 430' or 430"), variable matching subsystem 470, sensor(s) 490 (if included), and pump 492 (if included). System controller 412 is configured to receive signals indicating user inputs received via user interface 480, to receive signals indicating RF signal reflected power (and possibly RF signal forward power) from power detection circuitry 430 (or 430' or 430"), and to receive sensor signals from sensor(s) 490. Responsive to the received signals and measurements, and as will be described in more detail later, system controller 412 provides control signals to the power supply and bias circuitry 426 and/or to the RF signal generator 422 of the RF signal source 420. In addition, system controller 412 provides control signals to the variable matching subsystem 470 (over path 416), which cause the subsystem 470 to change the state or configuration of a variable impedance matching circuit 472 of the subsystem 470 (herein "variable matching circuit"). Finally, system controller 412 may provide control signals to pump 492, which cause the pump 492 to pump liquid (e.g., wastewater) through the conduit 460 at a desired flow rate.

The conduit 460 includes an input port 466 (e.g., input port 166, FIG. 1), an interior chamber 462 (e.g., interior chamber 260, FIG. 2), and an output port 468 (e.g., output port 168, FIG. 1). First and second electrodes 440, 450 (e.g., electrodes 140, 150, FIG. 1) are positioned in a fixed physical relationship with respect to each other on either side of the interior chamber 462 (e.g., interior chamber 260, FIG. 2). As discussed previously, a distance (e.g., distance 252, FIG. 2) between the electrodes 440, 450 renders the interior chamber 462 a sub-resonant chamber, in an embodiment.

An output of the RF subsystem 410, and more particularly an output of RF signal source 420, is electrically coupled to the variable matching subsystem 470 through a conductive transmission path, which includes a plurality of conductors 428-1, 428-2, 428-3, 428-4, and 428-5 connected in series, and referred to collectively as transmission path 428. According to an embodiment, the conductive transmission path 428 includes an "unbalanced" portion and a "balanced" portion, where the "unbalanced" portion is configured to carry an unbalanced RF signal (i.e., a single RF signal referenced against ground), and the "balanced" portion is configured to carry a balanced RF signal (i.e., two signals referenced against each other). The "unbalanced" portion of the transmission path 428 may include unbalanced first and second conductors 428-1, 428-2 within the RF subsystem 410, one or more connectors 436, 438 (each having male and female connector portions), and an unbalanced third conductor 428-3 electrically coupled between the connectors 436, 438. According to an embodiment, the third conductor 428-3 comprises a coaxial cable (e.g., cable 136, FIG. 1). In an alternate embodiment, and as mentioned previously, the variable matching subsystem 470 may be housed with the RF subsystem 410, and in such an embodiment, the conductive transmission path 428 may exclude the connectors 436, 438 and the third conductor 428-3. Either way, the "balanced" portion of the conductive transmission path 428 includes a balanced fourth conductor 428-4 within the variable matching subsystem 470, and a balanced fifth conductor 428-5 electrically coupled between the variable matching subsystem 470 and electrodes 440, 450, in an embodiment.

As indicated in FIG. 4, the variable matching subsystem 470 houses a balun 474, in an embodiment, which is configured to convert the unbalanced RF signal received from the RF signal source 420 over the unbalanced portion of the transmission path (i.e., the portion that includes unbalanced conductors 428-1, 428-2, and 428-3) into two balanced RF signals (e.g., RF signals having a phase difference between 120 and 240 degrees, such as about 180 degrees). The balanced RF signals are conveyed over balanced conductors 428-4 to the variable matching circuit 472 and, ultimately, over balanced conductors 428-5 to the electrodes 440, 450.

In an alternate embodiment, as indicated in a first dashed box in the center of FIG. 4, and as will be discussed in more detail below, an alternate RF signal generator 420' may produce balanced RF signals on balanced conductors 428-1', which may be directly coupled to the variable matching circuit 472 (or coupled through various intermediate conductors and connectors). In such an embodiment, the balun 474 may be excluded from the system 400. Either way, as will be described in more detail below, a double-ended variable matching circuit 472 (e.g., variable matching circuit 500, FIG. 5) is configured to receive the balanced RF signals (e.g., over connections 428-4 or 428-1'), to perform an impedance transformation corresponding to a then-current configuration of the double-ended variable matching circuit 472, and to provide the balanced RF signals to the first and second electrodes 440, 450 over connections 428-5.

In another alternate embodiment, the entire transmission path 428 may carry an unbalanced signal to a single electrode (e.g., electrode 440 or 340), and the other electrode (e.g., electrode 450) may be grounded. For example, as indicated in a second dashed box in the center of FIG. 4, and as will be discussed in more detail below, an alternate, single-ended variable matching subsystem 470' is configured to receive an unbalanced RF signal from the RF signal source 420 over an unbalanced conductor 428-4', to perform an impedance transformation corresponding to a then-current configuration of a single-ended variable matching circuit 472' (e.g., variable matching circuit 600, FIG. 6), and to provide an unbalanced signal to a first electrode 440 over connection 428-5'. In such an embodiment, the second electrode 450 may be grounded or excluded.

According to an embodiment, RF signal source 420 includes an RF signal generator 422 and a power amplifier 424 (e.g., including one or more power amplifier stages). In response to control signals provided by system controller 412 over connection 414, RF signal generator 422 is configured to produce an oscillating electrical signal having a frequency in an ISM (industrial, scientific, and medical) band, although the system could be modified to support operations in other frequency bands, as well. The RF signal generator 422 may be controlled to produce oscillating signals of different power levels and/or different frequencies, in various embodiments. For example, the RF signal generator 422 may produce a signal that oscillates in a range of about 10.0 MHz to about 100 MHz and/or from about 100 MHz to about 3.0 GHz. Some desirable frequencies may be, for example, 13.56 MHz (+/−5 percent), 27.125 MHz (+/−5 percent), 40.68 MHz (+/−5 percent), and 2.45 GHz (+/−5 percent). Alternatively, the frequency of oscillation may be lower or higher than the above-given ranges or values.

The power amplifier 424 is configured to receive the oscillating signal from the RF signal generator 422, and to amplify the signal to produce a significantly higher-power signal at an output of the power amplifier 424. For example, the output signal may have a power level in a range of about 1 watt to about 1000 watts or more, although the power level may be lower or higher, as well. The gain applied by the power amplifier 424 may be controlled using gate bias voltages and/or drain bias voltages provided by the power supply and bias circuitry 426 to one or more stages of amplifier 424. More specifically, power supply and bias circuitry 426 provides bias and supply voltages to the inputs and/or outputs (e.g., gates and/or drains) of each RF amplifier stage in accordance with control signals received from system controller 412.

Amplifier may include one or more amplification stages. In an embodiment, each stage of amplifier 424 is implemented as a power transistor, such as a field effect transistor (FET), having an input terminal (e.g., a gate or control terminal) and two current carrying terminals (e.g., source and drain terminals). Impedance matching circuits (not illustrated) may be coupled to the input (e.g., gate) and/or output (e.g., drain terminal) of some or all of the amplifier stages, in various embodiments. In an embodiment, each transistor of the amplifier stages includes a laterally diffused metal oxide semiconductor FET (LDMOS FET) transistor. However, it should be noted that the transistors are not intended to be limited to any particular semiconductor technology, and in other embodiments, each transistor may be realized as a gallium nitride (GaN) transistor, another type of MOS FET transistor, a bipolar junction transistor (BJT), or a transistor utilizing another semiconductor technology.

In FIG. 4, the power amplifier arrangement 424 is depicted to include one amplifier stage coupled in a particular manner to other circuit components. In other embodiments, the power amplifier arrangement 424 may include other amplifier topologies and/or the amplifier arrangement may include two or more amplifier stages. For example, the power amplifier arrangement may include various embodiments of a single ended amplifier, a double ended (balanced)

amplifier, a push-pull amplifier, a Doherty amplifier, a Switch Mode Power Amplifier (SMPA), or another type of amplifier.

For example, in a previously-mentioned alternate embodiment, as indicated in the first dashed box in the center of FIG. 4, an alternate RF signal generator 420' may include a balanced amplifier 424', which is configured to receive and amplify an RF signal from the RF signal generator 422, and to produce balanced RF signals over conductors 428-1'. In such an embodiment, the balun 474 may be excluded from the system 400, and the conductors 428-1' may be directly connected to the variable matching circuit 472 (or connected through multiple coaxial cables and connectors or other multi-conductor structures).

Interior chamber 462 and any substances (e.g., wastewater or other substances) within the interior chamber 462 present a cumulative load for the electromagnetic energy (or RF power) that is radiated into the interior chamber 462 by the electrodes 440, 450. More specifically, the interior chamber 462 and the material(s) within the chamber 462 present an impedance to the system, referred to herein as a "chamber input impedance." The chamber input impedance may vary significantly during a treatment operation as the characteristics of the substances moving through the chamber 462 change. The chamber input impedance has a direct effect on the magnitude of reflected signal power along the conductive transmission path 428 between the RF signal source 420 and the electrodes 440, 450. In most cases, it is desirable to minimize the magnitude of reflected signal power, and/or to minimize the reflected-to-forward signal power ratio along the conductive transmission path 428.

In order to at least partially match the output impedance of the RF signal generator 420 to the chamber input impedance, a first matching circuit 434 is electrically coupled along the transmission path 428, in an embodiment. The first matching circuit 434 may have any of a variety of configurations. According to an embodiment, the first matching circuit 434 includes fixed components (i.e., components with non-variable component values), although the first matching circuit 434 may include one or more variable components, in other embodiments. For example, the first matching circuit 434 may include any one or more circuits selected from an inductance/capacitance (LC) network, a series inductance network, a shunt inductance network, or a combination of bandpass, high-pass and low-pass circuits, in various embodiments. Essentially, the first matching circuit 434 is configured to raise the impedance to an intermediate level between the output impedance of the RF signal generator 420 and the chamber input impedance.

According to an embodiment, and as mentioned above, power detection circuitry 430 is coupled along the transmission path 428 between the output of the RF signal source 420 and the electrodes 440, 450. In a specific embodiment, the power detection circuitry 430 forms a portion of the RF subsystem 410, and is coupled to the conductor 428-2 between the RF signal source 420 and connector 436. In alternate embodiments, the power detection circuitry 430 may be coupled to any other portion of the transmission path 428, such as to conductor 428-1, to conductor 428-3, to conductor 428-4 between the RF signal source 420 (or balun 474) and the variable matching circuit 472 (i.e., as indicated with power detection circuitry 430'), or to conductor 428-5 between the variable matching circuit 472 and the electrode(s) 440, 450 (i.e., as indicated with power detection circuitry 430"). For purposes of brevity, the power detection circuitry is referred to herein with reference number 430, although the circuitry may be positioned in other locations, as indicated by reference numbers 430' and 430".

Wherever it is coupled, power detection circuitry 430 is configured to monitor, measure, or otherwise detect the power of the reflected signals traveling along the transmission path 428 between the RF signal source 420 and one or both of the electrode(s) 440, 450 (i.e., reflected RF signals traveling in a direction from electrode(s) 440, 450 toward RF signal source 420). In some embodiments, power detection circuitry 430 also is configured to detect the power of the forward signals traveling along the transmission path 428 between the RF signal source 420 and the electrode(s) 440, 450 (i.e., forward RF signals traveling in a direction from RF signal source 420 toward electrode(s) 440, 450).

Over connection 432, power detection circuitry 430 supplies signals to system controller 412 conveying the measured magnitudes of the reflected signal power, and in some embodiments, also the measured magnitude of the forward signal power. In embodiments in which both the forward and reflected signal power magnitudes are conveyed, system controller 412 may calculate a reflected-to-forward signal power ratio, or the S11 parameter. As will be described in more detail below, when the reflected signal power magnitude exceeds a reflected signal power threshold, or when the reflected-to-forward signal power ratio exceeds an S11 parameter threshold, this indicates that the system 400 is not adequately matched to the chamber input impedance, and that energy absorption by the substance within the chamber 462 may be sub-optimal. In such a situation, system controller 412 orchestrates a process of altering the state of the variable matching circuit 472 to drive the reflected signal power or the S11 parameter toward or below a desired level (e.g., below the reflected signal power threshold and/or the reflected-to-forward signal power ratio threshold), thus re-establishing an acceptable match and facilitating more optimal energy absorption by the substance within the chamber 462.

More specifically, the system controller 412 may provide control signals over control path 416 to the variable matching circuit 472 or 472', which cause the variable matching circuit 472 or 472' to vary inductive, capacitive, and/or resistive values of one or more components within the circuit, thus adjusting the impedance transformation provided by the circuit 472 or 472'. Adjustment of the configuration of the variable matching circuit 472 or 472' desirably decreases the magnitude of reflected signal power, which corresponds to decreasing the magnitude of the S11 parameter and increasing the power absorbed by the substance within the chamber 462.

The variable matching circuit 472 or 472' may have any of a variety of configurations. For example, the circuit 472 or 472' may include any one or more circuits selected from an inductance/capacitance (LC) network, an inductance-only network, a capacitance-only network, or a combination of bandpass, high-pass and low-pass circuits, in various embodiments. In an embodiment in which the variable matching circuit 472 is implemented in a balanced portion of the transmission path 428, the variable matching circuit 472 is a double-ended circuit with two inputs and two outputs. In an alternate embodiment in which the variable matching circuit 472' is implemented in an unbalanced portion of the transmission path 428, and/or the entire transmission path 428 is unbalanced (e.g., transmission path 428 is coupled to electrode 440 and electrode 450 is grounded), the variable matching circuit 472' may be a single-ended circuit with a single input and a single output. According to more specific embodiments, the variable matching circuit 472 or 472' includes a variable inductance network (e.g., double-ended network 500, FIG. 5 or single-ended network 600, FIG. 6). The inductance, capacitance, and/or resistance values provided by the variable matching circuit 472 or 472', which in turn affect the impedance transformation provided by the circuit 472 or 472', are established using control signals from the system controller 412, as will be described in more detail later. In any event, by changing the state of the variable matching circuit 472 or 472' over the course of a treatment operation to dynamically match the ever-changing impedance of the chamber 462 plus the substance within the chamber 462, the system efficiency may be maintained at a high level throughout the treatment operation.

Figure 5:
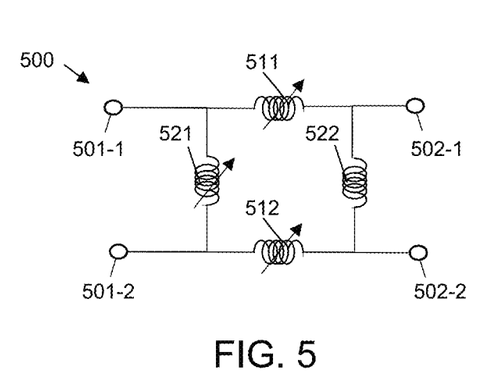
FIG. 5 is a schematic diagram of a double-ended variable impedance matching circuit, in accordance with an example embodiment.
Figure 6:
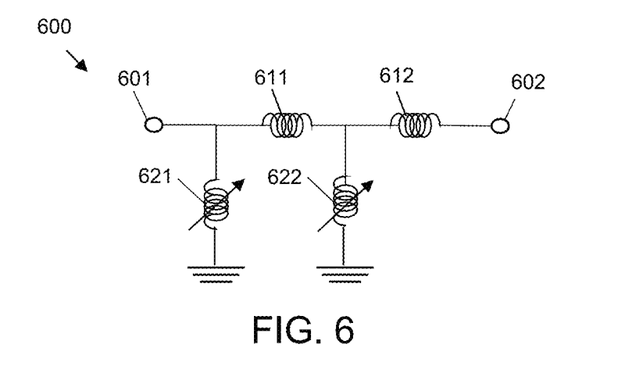
FIG. 6 is a schematic diagram of a single-ended variable impedance matching circuit, in accordance with an example embodiment.

The variable matching circuit 472 or 472' may have any of a wide variety of circuit configurations, and non-limiting examples of such configurations are shown in FIGS. 5 and 6. For example, FIG. 5 is a schematic diagram of a double-ended variable impedance matching circuit 500 that may be incorporated into a substance treatment system (e.g., system 100, 400, FIGS. 1, 4), in accordance with an example embodiment. According to an embodiment, the variable matching circuit 500 includes a network of fixed-value and variable passive components.

Circuit 500 includes a double-ended input 501-1, 501-2 (referred to as input 501), a double-ended output 502-1, 502-2 (referred to as output 502), and a network of passive components connected in a ladder arrangement between the input 501 and output 502. For example, when connected into system 400, the first input 501-1 may be connected to a first conductor of balanced conductor 428-4, and the second input 501-2 may be connected to a second conductor of balanced conductor 428-4. Similarly, the first output 502-1 may be connected to a first conductor of balanced conductor 428-5, and the second output 502-2 may be connected to a second conductor of balanced conductor 428-5.

In the specific embodiment illustrated in FIG. 5, circuit 500 includes a first variable inductor 511 connected between input 501-1 and output 502-1, a second variable inductor 512 connected between input 501-2 and output 502-2, a third variable inductor 521 connected between inputs 501-1 and 501-2, and a fixed inductor 522 connected between outputs 502-1 and 502-2. For example, each of the variable inductors 511, 512, 521 may be controllable (e.g., through control signals from system controller 412 over connection 416) to provide inductances in a range of about 10 nanohenries (nH) to about 400 nH, although the range may extend to lower or higher inductance values, as well. The fixed inductor 522 also may have an inductance in a range of about 10 nH to about 400 nH, although the inductance may be lower or higher, as well. Inductors 511, 512, 521, 522 may include discrete inductors, distributed inductors (e.g., printed coils), wirebonds, transmission lines, and/or other inductive components, in various embodiments. In an embodiment, variable inductors 511 and 512 are operated in a paired manner, meaning that their inductance values during operation are controlled to be equal to each other in order to ensure that the RF signals conveyed to outputs 502-1 and 502-2 are balanced.

As discussed above, variable matching circuit 500 is a double-ended circuit that is configured to be connected along a balanced portion of the transmission path 428 (e.g., between connectors 428-4 and 428-5), and other embodiments may include a single-ended (i.e., one input and one output) variable matching circuit that is configured to be connected along the unbalanced portion of the transmission path 428. For example, FIG. 6 is a schematic diagram of a single-ended variable impedance matching circuit 600 that may be incorporated into a substance treatment system (e.g., system 100, 300, 400, FIGS. 1-4) in which an unbalanced RF signal is provided to an electrode, in accordance with another embodiment.

Circuit 600 includes a single-ended input 601, a single-ended output 602, and a network of passive components connected between the input 601 and output 602. For example, when connected into system 400, the input 601 may be connected to unbalanced conductor 428-4', and the output 602 may be connected to unbalanced conductor 428-5'.

In the specific embodiment illustrated in FIG. 6, circuit 600 includes first and second fixed inductors 611, 612 connected in series between input 601 and output 602, a first variable inductor 621 connected between input 601 and ground, and a second variable inductor 622 connected between inductors 611, 612 and ground. For example, each of the variable inductors 621, 622 may be controllable (e.g., through control signals from system controller 412 over connection 416) to provide inductances in a range of about 10 nH to about 400 nH, in an embodiment, or in a range of about 400 nH to about 1600 nH, in another embodiment, although the range may extend to lower or higher inductance values, as well. The fixed inductors 611, 612 also may have inductances in a range of about 20 nH to about 400 nH, in an embodiment, or in a range of about 200 nH to about 600 nH, in another embodiment, although the inductances may be lower or higher, as well. Inductors 611, 612, 621, 622 may include discrete inductors, distributed inductors (e.g., printed coils), wirebonds, transmission lines, and/or other inductive components, in various embodiments.

By varying the inductance values of inductors 511, 512, 521, 621, 622 in circuit 500 or 600, the system controller 412 may increase or decrease the impedance transformation provided by circuit 500 or 600. Desirably, the inductance value changes improve the overall impedance match between the RF signal source 420 and the chamber input impedance, which should result in a reduction of the reflected signal power and/or the reflected-to-forward signal power ratio. In most cases, the system controller 412 may strive to configure the circuit 500 or 600 in a state in which a maximum electromagnetic field intensity is achieved in the chamber 462, and/or a maximum quantity of power is absorbed by the substance being treated as it passes through the chamber 462, and/or a minimum quantity of power is reflected by the substance being treated as it passes through the chamber 462.

It should be understood that the variable impedance matching circuits 500, 600 illustrated in FIGS. 5 and 6 are but two possible circuit configurations that may perform the desired variable impedance transformations. Other embodiments of variable impedance matching circuits may include differently arranged inductive networks, or may include passive networks that include inductors, capacitors, and/or resistors, where some of the passive components may be fixed-value components, and some of the passive components may be variable-value components (e.g., variable inductors, variable capacitors, and/or variable resistors). Further, the variable impedance matching circuit may include active devices (e.g., transistors) that switch passive components into and out of the network to alter the overall impedance transformation provided by the circuit. As used herein, the term "inductor" means a discrete inductor or a set of inductive components that are electrically coupled together without intervening components of other types (e.g., resistors or capacitors). Similarly, the term "capacitor" means a discrete capacitor, a capacitive structure formed from multiple conductive structures separated by a dielectric (e.g., air, dielectric material, or another dielectric medium) or a set of capacitive components that are electrically coupled together without intervening components of other types (e.g., resistors or inductors).

Referring back to FIG. 4, and as mentioned above, some embodiments of system 400 may include additional sensors 490, which may sense temperature of the substance being treated, electric field intensity within the chamber 462, the presence or quantity of various chemicals, pathogens, or contaminants, particulate density, clarity, and other characteristics. The additional sensor(s) 490 may convey the sensed information to the system controller 412 and/or to another controller that is responsible for controlling operations of the overall system (including upstream and downstream processes). Based on the sensed information, the controller(s) may alter the flow rate of the substance through the conduit 460, increase or decrease quantities of chemicals added to the substance, increase or decrease the power level of the RF signal produced by the RF signal source 420, alter the frequency or phasing of the balanced signals provided to the electrodes 440, 450, or make other adjustments to system operation. For example, the system controller 412 may alter the frequency and/or power of the RF signal supplied by the RF signal source 420 (e.g., by controlling the RF signal generator 422 and/or the bias and/or supply voltages provided by the power supply and bias circuitry 426).

Figure 7:
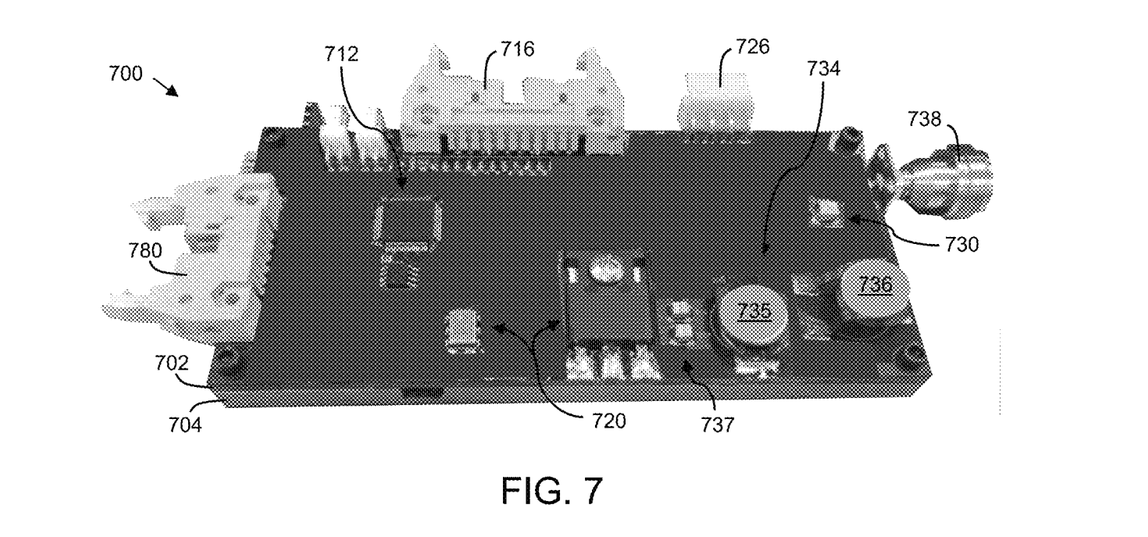
FIG. 7 is a perspective view of an RF module to be used in an embodiment of a substance treatment system, in accordance with an example embodiment.

According to various embodiments, the circuitry associated with the RF subsystem 410 and the variable matching subsystem 470 or 470' may be implemented on one or more circuit boards that form portions of one or more electronic modules. For example, FIG. 7 is a perspective view of an RF module 700 configured to be used in an embodiment of a substance treatment system (e.g., system 100-400, FIGS. 1-4), in accordance with an example embodiment. The RF module 700 includes a printed circuit board (PCB) 702 coupled to a ground substrate 704. The ground substrate 704 provides structural support for the PCB 702, and also provides an electrical ground reference and heat sink functionality for the various electrical components coupled to the PCB 702.

According to an embodiment, the PCB 702 houses the circuitry associated with the RF subsystem 410. Accordingly, the circuitry housed by the PCB 702 includes system controller circuitry 712 (e.g., corresponding to system controller 412, FIG. 4), RF signal source circuitry 720 (e.g., corresponding to RF signal source 420 or 420', FIG. 4, including an RF signal generator 422 and power amplifier 424), power detection circuitry 730 (e.g., corresponding to power detection circuitry 430, FIG. 4), and impedance matching circuitry 734 (e.g., corresponding to first matching circuitry 434, FIG. 4).

In the embodiment of FIG. 7, the system controller circuitry 712 includes a processor IC and a memory IC, the RF signal source circuitry 720 includes a signal generator IC and one or more power amplifier devices, the power detection circuitry 730 includes a power coupler device, and the impedance matching circuitry 734 includes a plurality of passive components (e.g., inductors 735, 736 and capacitors 737) connected together to form an impedance matching network. The circuitry 712, 720, 730, 734 and the various sub-components may be electrically coupled together through conductive traces on the PCB 702 as discussed previously in reference to the various conductors and connections discussed in conjunction with FIG. 4.

RF module 700 also includes a plurality of connectors 716, 726, 738, 780, in an embodiment. For example, connector 780 may be configured to connect with a host system that includes a user interface (e.g., user interface 480, FIG. 4) and other functionality. Connector 716 may be configured to connect with a variable matching circuit (e.g., circuit 472, 472', FIG. 4) to provide control signals to the circuit, as previously described. Connector 726 may be configured to connect to a power supply to receive system power. Finally, connector 738 (e.g., connector 436, FIG. 4) may be configured to connect to a coaxial cable or other transmission line, which enables the RF module 700 to be electrically connected (e.g., through a coaxial cable implementation of conductor 428-3) to a variable matching subsystem (e.g., subsystem 170, 470, 470', FIGS. 1, 4). In an alternate embodiment, components of the variable matching subsystem (e.g., balun 474 and/or variable matching circuit 472, 472') also may be integrated onto the PCB 702, in which case connector 738 may be excluded from the module 700. Other variations in the layout, subsystems, and components of RF module 700 may be made, as well.

Figure 8:
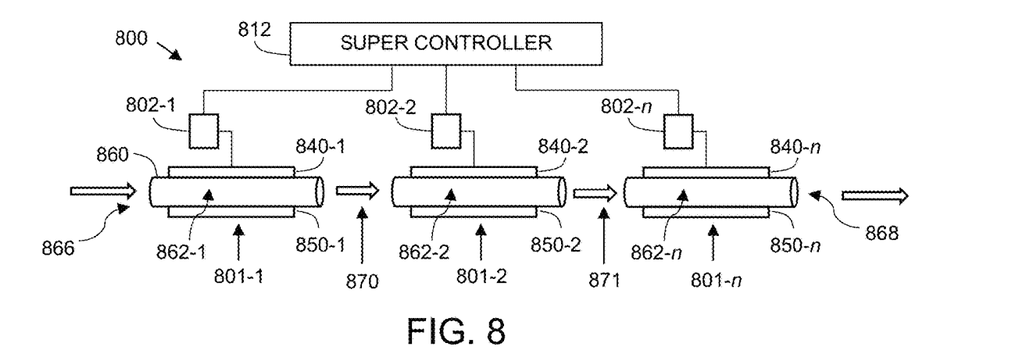
FIG. 8 is a simplified block diagram of a substance treatment system that includes a plurality of treatment sub-systems, in accordance with an example embodiment.

In the above-described embodiments, a single substance treatment system (e.g., system 100, 400, FIGS. 1, 4) is disposed along a conduit (e.g., conduit 160, 460, FIGS. 1, 4) to radiate electromagnetic energy corresponding to a single balanced or unbalanced RF signal into a chamber (e.g., chamber 260, 462, FIGS. 2, 4) through which a substance passes. In alternate embodiments, multiple substance treatment systems may be disposed in series along a single conduit to radiate electromagnetic energy corresponding to multiple balanced or unbalanced RF signals into multiple chambers along the conduit through which a substance passes. To illustrate, FIG. 8 is a simplified block diagram of a substance treatment system 800 that includes a plurality of treatment subsystems 801-1, 801-2, . . . 801-$n$, in accordance with an example embodiment. More particularly, substance treatment system 800 includes n substance treatment subsystems, where n may be any integer greater than 2 (e.g., an integer in a range of 2 to 5 or more). Although FIG. 8 shows three substance treatment subsystems 801-1, 801-2, 801-$n$ disposed in series along a conduit 860, a multiple-subsystem substance treatment system 800 may include more or fewer substance treatment subsystems.

The substance treatment system 800 includes a conduit 860 with an input port 866, an output port 868, and multiple interior chambers 862-1, 862-2, 862-$n$ (e.g., multiple instances of chamber 260, 462, FIGS. 2, 4) disposed in series along the length of the conduit 860. In FIG. 8, the conduit 860 is illustrated to have discontinuities 870, 871, which are meant to indicate that various other components (e.g., sensors, pumps, filters, grinders, chemical input ports, etc.) may be disposed between the subsystems 801-1, 801-2, . . . 801-$n$, and/or that the lengths of portions of the conduit 860 between the subsystems 801-1, 801-2, . . . 801-$n$ may be arbitrary.

According to an embodiment, a substance treatment subsystem 801-1, 801-2, 801-$n$ is electromagnetically coupled to each chamber 862-1, 862-2, 862-$n$ in a manner that is substantially similar to the manners in which systems 100, 300, 400 (FIGS. 1-4) were described above to be electromagnetically coupled to chambers 260, 462 (FIGS. 2, 4). Each subsystem may include an electronics module or subsystem 802-1, 802-2, 802-$n$ with an RF signal source (e.g., RF signal source 420, 420', FIG. 4), a variable matching circuit (e.g., circuit 472, 472', FIG. 4), a power detector circuit (e.g., power detector circuit 430, 430', 430'', FIG. 4), and one or more electrodes (e.g., electrodes 140, 150, 340, 440, 450, FIGS. 1-4). More specifically, each substance treatment subsystem 801-1, 801-2, 801-$n$ may include a first electrode 840-1, 840-2, 840-*n* and a second electrode 850-1, 850-2, 850-*n* positioned on opposite sides of each chamber 862-1, 862-2, 862-*n*. Based on signals from each power detector circuit, an RF signal is provided by an RF signal source of each electronics module or subsystem 802-1, 802-2, 802-*n* through a variable impedance matching circuit to both of the electrodes (e.g., in a system in which the RF signal is a balanced signal) or to one electrode (e.g., in a system in which the RF signal is a single unbalanced signal and the second electrode is grounded, or a system such as the system of FIG. 3 in which a single electrode 340 inductively couples electromagnetic energy into the chamber).

In some embodiments, the frequency and power level of the RF signal provided by each subsystem 801-1, 801-2, . . . 801-*n* may be the same. In other embodiments, the frequency and power level of the RF signal provided by each subsystem 801-1, 801-2, . . . 801-*n* may differ. In such embodiments, the frequency and power level of the RF signal provided by each subsystem 801-1, 801-2, . . . 801-*n* may be controllable by a super-controller 812. Further, the activation status (e.g., on or off) of each subsystem 801-1, 801-2, . . . 801-*n* may be controlled by the super-controller 812. For example, the various chemical agents, and/or pathogens, and/or materials that may be present in a substance being treated may react differently to the application of RF signals with different frequencies and/or power levels. In such a situation, the super-controller 812 may control the various subsystems 801-1, 801-2, . . . 801-*n* to radiate RF signals with different frequencies and/or power levels to achieve the desired chemical activations and/or pathogen destructions and/or material transformations. For example, the super-controller 812 may receive sensor signals indicating water or air quality, substance or effluent temperature, pathogen levels, chemical levels, particulate levels, and so on, and may control the frequencies and/or power levels of the RF signals produced by the RF signal sources in each of the subsystems 801-1, 801-2, . . . 801-*n* to achieve desired results. Alternatively, the super-controller 812 may monitor the effectiveness of the system 800 by monitoring characteristics of the substance or effluent at one or more points along the conduit 860, and may activate or deactivate various combinations of subsystems 801-1, 801-2, . . . 801-*n* accordingly.

In some embodiments, the super-controller 812 may perform the functionalities of the previously-described system controller 412, FIG. 4 (e.g., receiving signals indicating reflected power, and adjusting the variable matching circuits accordingly), or those functionalities may be retained in each subsystem 801-1, 801-2, . . . 801-*n*, and the super-controller 812 may control other aspects of the system operation.

Figure 9:
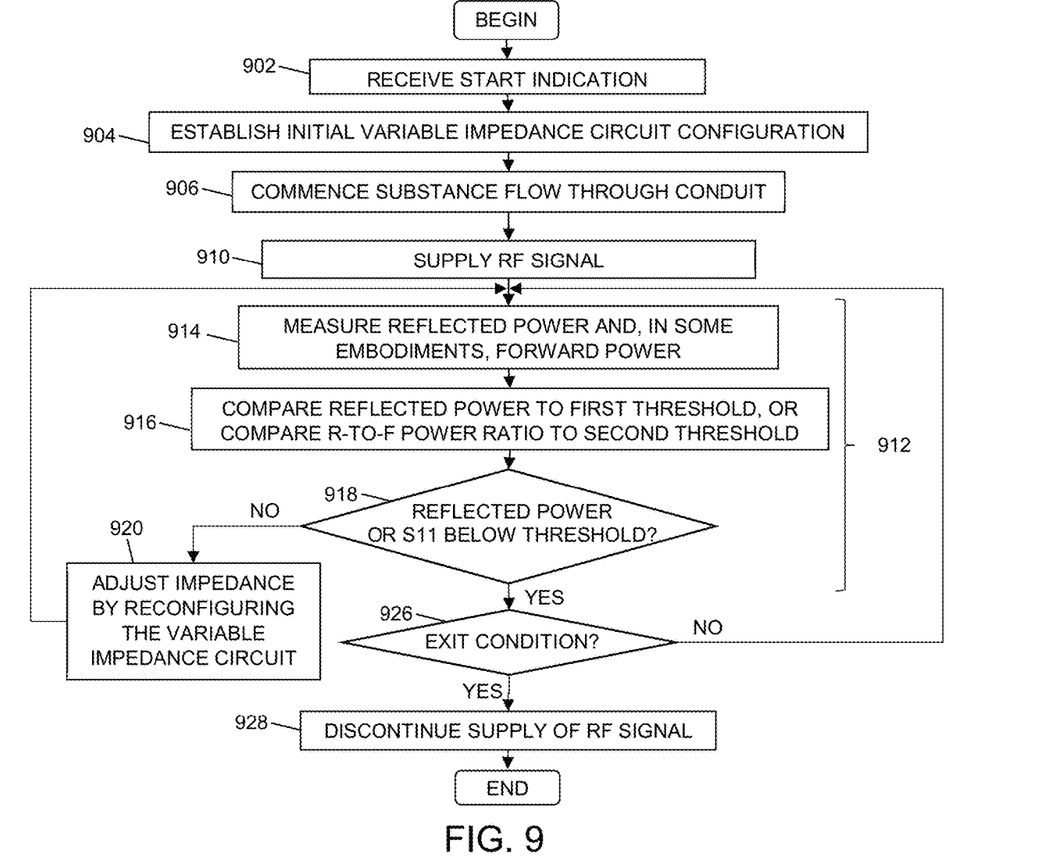
FIG. 9 is a flowchart of a method of operating a substance treatment system, in accordance with an example embodiment.

Now that embodiments of the electrical and physical aspects of substance treatment system embodiments have been described, various embodiments of methods for operating such treatment systems will now be described in conjunction with FIG. 9. More specifically, FIG. 9 is a flowchart of a method of operating a substance treatment system (e.g., system 100, 300, 400, 800, FIGS. 1-4, 8), in accordance with an example embodiment.

The method may begin, in block 902, when the system controller (e.g., system controller 412, FIG. 4) receives an indication that a treatment operation should start. Such an indication may be received, for example, after a user has pressed a power button (e.g., of the user interface 480, FIG. 4). According to various embodiments, the system controller optionally may receive additional inputs, such as an indication of a desired duration of the treatment operation, a desired RF power level (e.g., low, medium, or high level), a desired substance flow rate through the conduit, and other inputs that are relevant to the operation.

In block 904, the system controller provides control signals to the variable impedance matching circuit (e.g., circuit 472, 472', FIG. 4) to establish an initial configuration or state for the variable impedance circuit, where each configuration or state results in a different amount of impedance transformation (e.g., different impedance transformations in a range of zero ohms to 200 ohms). For example, the variable impedance matching circuit may have just a few possible configurations (e.g., from 4 to 16), or may have many possible configurations (e.g., tens to hundreds or more). In various embodiments, the system controller may initially configure the variable impedance matching circuit in a state that provides a maximum impedance transformation possible with the circuit, a minimum impedance transformation possible with the circuit, about half of the maximum impedance transformation possible with the circuit, or another pre-determined initial impedance transformation. Alternatively, the system controller may cause the system to produce test signals and to take test measurements (e.g., of reflected and forward power) in an iterative process that is used to determine an acceptable initial configuration or impedance transformation. As described in detail in conjunction with FIGS. 4-6, the control signals from the system controller affect the component values within the matching circuit (e.g., inductances, capacitances, and/or resistances), and thus the impedance transformation provided by the circuit. For example, the control signals may affect the component values of the inductors 511, 512, 521, 621, 622 in the example variable matching impedance circuits 500, 600 of FIGS. 5 and 6.

Before or after the initial variable matching circuit configuration is established, in block 906, the system controller may send control signals (e.g., to pump 492, FIG. 4) to commence the flow of the substance (e.g., water, wastewater, air, solid materials, and so on) through the conduit (e.g., conduit 160, 460, 860, FIGS. 1-4, 8). The flow rate may be controlled through control signals from the system controller to the pump (e.g., pump 492, FIG. 4). Flow rate sensors (not illustrated) in the conduit may provide feedback signals that enable the system controller to more finely control the flow rate.

As discussed previously, the substance to be treated flows from an input port (e.g., port 166, 466, 866, FIGS. 1, 4, 8), through the interior chamber (e.g., interior chamber 260, 462, 862-1, 862-2, 862-*n*, FIGS. 2, 4, 8), and out through an output port (e.g., port 168, 468, 868, FIGS. 1-4, 8). As the substance flows through the interior chamber, and more specifically through the portion of the conduit between the electrodes (e.g., electrodes 140, 150, 340, 440, 450, 840, 850), the electromagnetic energy radiated by the electrodes into the chamber and the substance may act as a catalyst to accelerate chemical reactions associated with the substance treatment process. When the energy level is sufficient, the energy may kill pathogens (e.g., bacterium, viruses, fungi, and other microorganisms) in the substance, accelerate the process of breaking down solid matter within the substance, or otherwise alter the state of the substance as it passes through the chamber.

In block 910, the system controller causes the RF signal source (e.g., RF signal source 420, 420') to supply a continuous or intermittent RF signal through the variable impedance circuit to the electrodes (e.g., electrodes 140, 150, 340, 440, 450, 840, 850, FIGS. 1-4, 8). During operation, the system controller may control the RF signal power level through control signals to the power supply and bias circuitry (e.g., circuitry 426, FIG. 4), where the control signals cause the power supply and bias circuitry to provide supply and bias voltages to the amplifiers (e.g., amplifier 424, 424', FIG. 4).

As the treatment operation continues, the system controller may perform a process 912 of adjusting, if necessary, the configuration of the variable impedance circuit to find an acceptable or best impedance match between the RF signal source and the chamber plus the substance within the chamber. This operation, which includes blocks 914, 916, 918, and 920, may be performed based on actual measurements that are indicative of the quality of the impedance match.

In block 914, power detection circuitry (e.g., circuitry 430, 430', 430", FIG. 4) measures the magnitude of the reflected power along the transmission path between the RF signal source and the electrode(s). In some embodiments, the power detection circuitry also may measure the magnitude of the forward power along the transmission path. The power detection circuitry may provide those measurements to the system controller (e.g., system controller 412 or 812, FIGS. 4, 8), and the system controller may determine whether the match provided by the variable impedance circuit is acceptable. For example, in block 916, the system controller may compare the sensed reflected power to a first threshold to determine whether the sensed reflected power is above or below the first threshold. For example, the first threshold may be a reflected power in a range of about 5 percent to about 20 percent of the forward power, although the first threshold may have a lower or higher value, as well. In addition or alternatively, the system controller may calculate the reflected-to-forward (r-to-f) power ratio, and may compare the ratio to a second threshold to determine whether the ratio is above or below the second threshold. For example, the second threshold may be a threshold value between about 0.05 and about 0.2 although the second threshold may have a lower or higher value, as well.

When the system controller determines, in block 918, that the match is not acceptable (e.g., the reflected power and/or the reflected-to-forward power ratio are above their associated thresholds), the system controller may adjust the match, in block 920, by reconfiguring the variable impedance circuit. For example, this may be achieved by sending control signals to the variable impedance circuit, which cause the circuit to increase or decrease the amount of impedance transformation provided by the circuit by increasing and/or decreasing the variable inductances or other component values within the circuit. This, in turn, may increase or decrease the reflected power magnitude and/or the reflected-to-forward power ratio. Various algorithms may be utilized to adjust the magnitude of the impedance transformation.

In an embodiment, the system may iteratively test each possible configuration of the variable impedance circuit to attempt to determine an acceptable initial or subsequent configuration. Alternatively, the system may test a configuration that is likely to yield an acceptable match. When the configuration does not yield such a match, the system may test one or more other configurations in an attempt to zero in on an acceptable match. In actuality, a variety of different searching methods are available that the system controller may employ to initially configure and/or re-configure the system to achieve an acceptable impedance match, including testing all possible variable impedance matching circuit configurations. Any reasonable method of searching for an acceptable configuration is considered to fall within the scope of the inventive subject matter.

After reconfiguring the variable impedance circuit, blocks 914, 916, and 918 may be iteratively performed until an acceptably low reflected power and/or reflected-to-forward power ratio is measured (e.g., the reflected power is below the first threshold and/or the reflected-to-forward power ratio is below the second threshold), indicating that the variable impedance circuit is in a configuration for which the RF signal source is acceptably matched to the chamber input impedance.

While the system is acceptably matched (e.g., a determination is made in block 918 that the reflected power is below the first threshold and/or the reflected-to-forward power ratio is below the second threshold), the system may evaluate whether an exit condition has occurred, in block 926. In actuality, determination of whether an exit condition has occurred may be an interrupt driven process that may occur at any point during the treatment operation. However, for the purposes of including it in the flowchart of FIG. 9, the process is shown to occur after block 918.

For example, the system may determine that an exit condition has occurred when a user has pressed a button indicating that the user would like the treatment operation to cease. Alternatively, the system may determine that an exit condition has occurred upon expiration of a timer that was set by the user (e.g., through user interface 480, FIG. 4), or based on some other predetermined or detected criteria.

If an exit condition has not occurred, then the treatment operation may continue by iteratively performing process 910. When an exit condition has occurred, then in block 928, the system controller causes the supply of the RF signal by the RF signal source to be discontinued. For example, the system controller may disable the RF signal generator (e.g., RF signal generator 420, 420', FIG. 4) and/or may cause the power supply and bias circuitry (e.g., circuitry 426, FIG. 4) to discontinue provision of the supply current. The method may then end.

For the sake of brevity, conventional techniques related to amplifiers, biasing, impedance matching, and other functional aspects of the systems (and the individual operating components of the systems) may not be described in detail herein. The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

An embodiment of a substance treatment apparatus is disclosed, where the apparatus is configured to apply electromagnetic energy to a substance flowing through a conduit that includes an input port and an output port. The apparatus includes a first RF signal source, a first transmission path, first power detection circuitry, and a controller. The first RF signal source includes a solid-state amplifier configured to generate a first RF signal. The first transmission path is electrically coupled between an output of the first RF signal source and a first electrode. The first electrode is configured to convert a received RF signal into electromagnetic energy that is radiated by the first electrode into a first chamber of the conduit that is located between the input and output ports. The first power detection circuitry is configured to detect reflected signal power along the first transmission path. The controller is configured to modify, based on the reflected signal power, one or more component values of components within a first impedance matching network electrically coupled along the first transmission path between the output of the first RF signal source and the first electrode to adjust a magnitude of the reflected signal power.

According to a further embodiment, the apparatus further includes the first electrode physically positioned at a first boundary of the first chamber, and a second electrode physically positioned at a second boundary of the chamber. The first electrode, the second electrode, and the chamber form a structure that is configured to capacitively couple the electromagnetic energy into a substance within the chamber.

According to a further embodiment, the first impedance matching network includes one or more variable passive components, and the controller is configured to establish and modify a configuration of the first impedance matching network through control signals that the controller sends to the first impedance matching network, where the control signals cause changes in component values of the one or more variable passive components.

According to a further embodiment, the apparatus also includes a balun coupled between the RF signal source and the first impedance matching network. The balun is configured to convert the RF signal received from the RF signal source into a first balanced RF signal. The first impedance matching network includes a double-ended input and a double-ended output, and the first impedance matching network is configured to perform an impedance transformation of the first balanced RF signal received at the double-ended input to produce a second balanced RF signal at the double-ended output. A first output of the double-ended output is coupled to the first electrode, a second output of the double-ended output is coupled to a second electrode, and the first chamber is positioned between the first and second electrodes.

According to a further embodiment, the first impedance matching network includes a single-ended input and a single-ended output, and the first impedance matching network is configured to perform an impedance transformation of the first RF signal received at the single-ended input to produce a second RF signal at the single-ended output. The single-ended output is coupled to the first electrode, and the second electrode is coupled to ground.

According to a further embodiment, the apparatus further includes an additional RF signal source configured to generate an additional RF signal, an additional transmission path, and additional power detection circuitry. The additional transmission path is electrically coupled between an output of the additional RF signal source and an additional electrode, and the additional electrode is configured to convert an additional received RF signal into electromagnetic energy that is radiated by the additional electrode into the conduit. The additional power detection circuitry is configured to detect reflected signal power along the additional transmission path. The controller (or an additional controller) is configured to modify, based on the reflected signal power along the additional transmission path, one or more component values of an additional impedance matching network to adjust a magnitude of the reflected signal power along the additional transmission path.

Also disclosed is an embodiment of a method of operating a substance treatment apparatus configured to apply electromagnetic energy to a substance flowing through a conduit that includes an input port and an output port. The method includes generating a first RF signal by a first solid-state amplifier of an RF signal source, and detecting, by power detection circuitry, reflected signal power along a transmission path that is electrically coupled between an output of the RF signal source and a first electrode. The first electrode is configured to convert a received RF signal into electromagnetic energy that is radiated by the first electrode into a chamber of the conduit that is located between the input and output ports. The method further includes modifying, by a controller based on the reflected signal power, one or more component values of components within an impedance matching network electrically coupled along the transmission path between the output of the first RF signal source and the first electrode to adjust a magnitude of the reflected signal power.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A substance treatment apparatus configured to apply electromagnetic energy to a substance flowing through a conduit that includes an input port and an output port, the apparatus comprising:
   a first radio frequency (RF) signal source that includes a solid-state amplifier configured to generate a first RF signal;
   a first transmission path electrically coupled between an output of the first RF signal source and a first electrode that is configured to convert a received RF signal into electromagnetic energy that is radiated by the first electrode into a chamber of the conduit that is located between the input and output ports, wherein the chamber is defined by first and second boundaries that are separated by a distance;

the first electrode physically positioned at the first boundary;

a second electrode physically positioned at the second boundary, wherein the first and second electrodes each have a planar conductive structure, and wherein the first electrode, the second electrode, and the chamber form a structure that is configured to capacitively couple the electromagnetic energy into a substance within the chamber;

first power detection circuitry configured to detect reflected signal power along the first transmission path; and a controller configured to modify, based on the reflected signal power, one or more component values of components within a first impedance matching network electrically coupled along the first transmission path between the output of the first RF signal source and the first electrode to adjust a magnitude of the reflected signal power.

2. The substance treatment apparatus of claim 1, wherein the distance is less than half of one wavelength of the RF signal.

3. The substance treatment apparatus of claim 1, wherein the RF signal source is configured to generate the first RF signal to produce a voltage across the first and second electrodes in a range of 90 volts to 10,000 volts.

4. A substance treatment apparatus configured to apply electromagnetic energy to a substance flowing through a conduit that includes an input port and an output port, the apparatus comprising:

a radio frequency (RF) signal source that includes a solid-state amplifier configured to generate an RF signal;

a transmission path electrically coupled between an output of the RF signal source and an electrode that is configured to convert a received RF signal into electromagnetic energy that is radiated by the electrode into a chamber of the conduit that is located between the input and output ports, wherein the electrode is a conductive helix that is wound around the conduit along a length of the chamber, and wherein a first end of the conductive helix is electrically connected to the RF signal source;

power detection circuitry configured to detect reflected signal power along the transmission path; and a controller configured to modify, based on the reflected signal power, one or more component values of components within an impedance matching network electrically coupled along the transmission path between the output of the RF signal source and the electrode to adjust a magnitude of the reflected signal power.

5. A substance treatment apparatus configured to apply electromagnetic energy to a substance flowing through a conduit that includes an input port and an output port, the apparatus comprising:

a first radio frequency (RF) signal source that includes a solid-state amplifier configured to generate a first RF signal;

a first transmission path electrically coupled between an output of the first RF signal source and a first electrode that is configured to convert a received RF signal into electromagnetic energy that is radiated by the first electrode into a first chamber of the conduit that is located between the input and output ports;

first power detection circuitry configured to detect reflected signal power along the first transmission path;

a first impedance matching network, which includes one or more variable passive components, and which is electrically coupled along the first transmission path between the output of the first RF signal source and the first electrode; and a controller configured to modify, based on the reflected signal power, one or more component values of components within the first impedance matching network to adjust a magnitude of the reflected signal power, wherein the controller is configured to establish and modify a configuration of the first impedance matching network through control signals that the controller sends to the first impedance matching network, wherein the control signals cause changes in component values of the one or more variable passive components.

6. The substance treatment apparatus of claim 5, wherein the first RF signal has a frequency in a range from 10 megahertz (MHz) to 3.0 gigahertz (GHz).

7. The substance treatment apparatus of claim 5, wherein the one or more variable passive components are selected from variable inductors, variable capacitors, and variable resistors.

8. The substance treatment apparatus of claim 5, further comprising:

a balun coupled between the first RF signal source and the first impedance matching network, wherein the balun is configured to convert the first RF signal received from the first RF signal source into a first balanced RF signal, wherein the first impedance matching network includes a double-ended input and a double-ended output, wherein the first impedance matching network is configured to perform an impedance transformation of the first balanced RF signal received at the double-ended input to produce a second balanced RF signal at the double-ended output, and wherein a first output of the double-ended output is coupled to the first electrode, wherein a second output of the double-ended output is coupled to a second electrode, and wherein the first chamber is positioned between the first and second electrodes.

9. The substance treatment apparatus of claim 5, wherein:

the first impedance matching network includes a single-ended input and a single-ended output, wherein the first impedance matching network is configured to perform an impedance transformation of the first RF signal received at the single-ended input to produce a second RF signal at the single-ended output, and the single-ended output is coupled to the first electrode, and the second electrode is coupled to ground.

10. The substance treatment apparatus of claim 5, wherein:

the controller is configured to determine whether the reflected signal power exceeds a threshold, and when the reflected signal power exceeds the threshold, to modify the one or more component values of the components within the first impedance matching network to reduce the reflected signal power.

11. The substance treatment apparatus of claim 5, wherein:

during operation of the substance treatment apparatus, the first RF signal has a forward signal power along the first transmission path;

the first power detection circuitry also is configured to detect the forward signal power; and the controller is configured to determine whether a ratio of the forward-to-reflected signal power exceeds a threshold, and when the ratio exceeds the threshold, to modify the one or more component values of the components within the first impedance matching network to reduce the ratio.

12. The substance treatment apparatus of claim 5, further comprising:
an additional RF signal source configured to generate an additional RF signal;
an additional transmission path electrically coupled between an output of the additional RF signal source and an additional electrode, wherein the additional electrode is configured to convert an additional received RF signal into electromagnetic energy that is radiated by the additional electrode into the conduit; and
additional power detection circuitry configured to detect reflected signal power along the additional transmission path.

13. The substance treatment apparatus of claim 12, further comprising:
an additional impedance matching network including one or more additional variable passive components,
wherein the controller is configured to modify, based on the reflected signal power along the additional transmission path, one or more component values of the additional impedance matching network to adjust a magnitude of the reflected signal power along the additional transmission path.

14. The substance treatment apparatus of claim 12, further comprising:
an additional impedance matching network including one or more additional variable passive components, and
an additional controller, wherein the additional controller is configured to modify, based on the reflected signal power along the additional transmission path, one or more component values of the additional impedance matching network to adjust a magnitude of the reflected signal power along the additional transmission path.

15. A method of operating a substance treatment apparatus configured to apply electromagnetic energy to a substance flowing through a conduit that includes an input port and an output port, the method comprising:
generating a first RF signal by a first solid-state amplifier of an RF signal source;
detecting, by power detection circuitry, reflected signal power along a transmission path that is electrically coupled between an output of the RF signal source and a first electrode that is configured to convert a received RF signal into electromagnetic energy that is radiated by the first electrode into a chamber of the conduit that is located between the input and output ports; and
modifying, by a controller based on the reflected signal power, one or more component values of components within an impedance matching network electrically coupled along the transmission path between the output of the first RF signal source and the first electrode to adjust a magnitude of the reflected signal power.

16. The method of claim 15, wherein the impedance matching network includes one or more variable passive components, and the method further comprises:
establishing and modifying, by the controller, a configuration of the impedance matching network through control signals that the controller sends to the impedance matching network, wherein the control signals cause changes in component values of the one or more variable passive components.

17. The method of claim 15, wherein the impedance matching network includes a double-ended input and a double-ended output, and the method further comprises:
converting, by a balun coupled between the RF signal source and the impedance matching network, the first RF signal received from the RF signal source into a first balanced RF signal; and
the impedance matching network performing an impedance transformation of the first balanced RF signal received at the double-ended input to produce a second balanced RF signal at the double-ended output, wherein the second balanced RF signal is provided to the first electrode and to a second electrode, and wherein the chamber is positioned between the first and second electrodes.

18. The method of claim 15, wherein the impedance matching network includes a single-ended input and a single-ended output, and the method further comprises:
the impedance matching network performing an impedance transformation of the first RF signal received at the single-ended input to produce a second RF signal at the single-ended output, wherein the second RF signal is provided to the first electrode, and the apparatus includes a second electrode that is coupled to ground.

* * * * *